United States Patent
Heyder et al.

(10) Patent No.: US 7,320,185 B2
(45) Date of Patent: Jan. 22, 2008

(54) DRIVE DEVICE FOR A HOUSEHOLD APPLIANCE AND METHOD FOR MOUNTING AN ELECTRIC MOTOR

(75) Inventors: Reinhard Heyder, Berlin (DE); Jörg Skrippek, Priort (DE)

(73) Assignee: BSH Bosch und Siemens Hausgeraeta GmbH, Munich (DE)

( * ) Notice: Subject to any disclaimer, the term of this patent is extended or adjusted under 35 U.S.C. 154(b) by 0 days.

(21) Appl. No.: 10/462,421

(22) Filed: Jun. 16, 2003

(65) Prior Publication Data

US 2004/0084602 A1 May 6, 2004

Related U.S. Application Data

(63) Continuation of application No. PCT/EP01/13448, filed on Nov. 20, 2001.

(30) Foreign Application Priority Data

Dec. 14, 2000 (DE) ................ 100 62 364

(51) Int. Cl.
*F26B 11/02* (2006.01)
(52) U.S. Cl. .......................... 34/602; 34/603
(58) Field of Classification Search ............... 248/637, 248/674, 680, 200; 174/137 R, 138 J; 34/602, 34/603, 604
See application file for complete search history.

(56) References Cited

U.S. PATENT DOCUMENTS

| | | | | |
|---|---|---|---|---|
| 3,930,380 A | * | 1/1976 | Fogt | 464/57 |
| 4,167,660 A | * | 9/1979 | Liedtke | 200/567 |
| 4,689,896 A | * | 9/1987 | Narang | 34/82 |
| 4,728,838 A | * | 3/1988 | Mandel et al. | 310/91 |
| 4,795,618 A | * | 1/1989 | Laumen | 422/202 |
| 4,911,609 A | * | 3/1990 | Anderson et al. | 415/174.2 |
| 4,992,690 A | * | 2/1991 | Baker | 310/89 |
| 5,023,505 A | * | 6/1991 | Ratliff et al. | 313/25 |
| 5,232,775 A | | 8/1993 | Chamberlain et al. | 68/140 |
| 5,555,647 A | * | 9/1996 | Torborg et al. | 34/601 |
| 5,828,008 A | * | 10/1998 | Lockwood et al. | 174/138 R |
| 6,097,122 A | * | 8/2000 | Bock | 310/93 |
| 6,432,344 B1 | * | 8/2002 | Eckman et al. | 264/263 |
| 6,499,323 B2 | | 12/2002 | Skippek et al. | 428/323 |
| 6,530,757 B1 | * | 3/2003 | Soyer et al. | 417/423.14 |
| 2004/0061430 A1 | * | 4/2004 | Derraa | 313/495 |

FOREIGN PATENT DOCUMENTS

| | | | | |
|---|---|---|---|---|
| DE | 199 11 139 A1 | 9/2000 | | 37/30 |
| DE | 199 37 229 A1 | 2/2001 | | 37/30 |
| EP | 0 947 622 A2 | 10/1999 | | 37/30 |
| EP | 1372250 A2 | * 12/2003 | | |
| GB | 2 197 431 A | 5/1988 | | 7/2 |

* cited by examiner

*Primary Examiner*—A. Joseph Wujciak, III
(74) *Attorney, Agent, or Firm*—Russell W. Warnock; James E. Howard

(57) ABSTRACT

A drive device for a household appliance, in which an electromotor is fixed by a fixing screw. An insulation layer of a material with a defined conductivity is located between the fixing screw and the electromotor. The fixing screw is tightened with a defined torque such that, due to the resultant defined contact pressure, a defined resistance for discharging electrostatic charges from the electromotor is obtained. This simultaneously ensures the suppression of leakage currents. A method for mounting an electric motor is also disclosed.

18 Claims, 5 Drawing Sheets

DRIVE DEVICE FOR A HOUSEHOLD APPLIANCE AND METHOD FOR MOUNTING AN ELECTRIC MOTOR

CROSS-REFERENCE TO RELATED APPLICATION

This application is a continuation of copending International Application No. PCT/EP01/13448, filed Nov. 20, 2001, which designated the United States and was not published in English.

BACKGROUND OF THE INVENTION

Field of the Invention

The invention relates to a drive device for a household appliance with an electric motor and measures for fastening the electric motor and also to a method for mounting an electric motor in or on a household appliance.

German Published, Non-Prosecuted Patent Application DE 199 37 229 A1 discloses the problem of so-called discharge currents, which occur in the case of a drive device for a washing machine with an electric motor. Discharge currents are caused by capacitive effects in the case of an electric motor with a converter drive or an electronically commutated DC motor, i.e., a frequency-converted electric motor, in particular, at high conversion frequencies, for example, at 16 to 20 kHz. Such high-frequency discharge currents may be problematical with regard to the electromagnetic compatibility. To prevent the discharge currents, it has, therefore, been proposed to produce the supporting body of the stator supporting part or the stator supporting part of the electric motor as a whole from electrically nonconductive plastic.

One disadvantage of this is that such plastic stator supporting parts do not have great dimensional stability. A further disadvantage is that, on account of the complete insulation of the electric motor, it is also not possible, for example, for electrostatic charges to be discharged.

SUMMARY OF THE INVENTION

It is accordingly an object of the invention to provide a drive device for a household appliance and method for mounting an electric motor that overcome the hereinaforementioned disadvantages of the heretofore-known devices and methods of this general type and that improves the drive device of the type stated at the beginning and also provides an improved household appliance and an improved method for mounting an electric motor.

With the foregoing and other objects in view, there is provided, in accordance with the invention, a drive device for a household appliance having an electric motor, the drive device including a motor fastening device for fastening the electric motor to the appliance and an insulator disposed between the fastening device and the electric motor for electrically insulating the electric motor from the fastening device, the insulator having a defined resistance for discharging electrostatic charges from the electric motor.

The invention allows discharge currents to be effectively suppressed in order to ensure the electromagnetic compatibility of the household appliance. Because, the electric motor is not completely electrically insulated, however, electrostatic charges can, nevertheless, be discharged through the defined resistance of the insulating material provided with a residual conductivity.

The insulating material may be a conductive plastic or else a plastic that is not conductive itself with which conductive material is admixed. In accordance with a further feature of the invention, the conductive material is carbon and/or metal powder.

In accordance with another feature of the invention, the resistance of the insulator between the electric motor and the fastening device is between approximately 0.5 megaohms and approximately 2 megaohms. Preferably, a defined resistance between the electric motor and its fastening of, preferably, one megaohm is realized as a result. Such a resistance leads to effective suppression of the discharge currents and at the same time allows efficient discharging of an electrostatic charge.

The defined resistance between the electric motor and its fastening is, advantageously, fixed, on one hand, by the conductivity of the insulating material and, on the other hand, by a defined contact pressure of the insulating material between the electric motor and its fastening. The defined overall resistance is, then, obtained from the sum of the resistances of the insulating material and the electric motor/insulating material and insulating material/fastening transition resistances. The resistance of the insulating material is determined by its residual conductivity; the resistance of the transition resistances is determined by the defined contact pressure.

In accordance with an added feature of the invention, there is provided a contact pressure device disposed between the electric motor and the fastening device for producing a defined contact pressure.

In accordance with an additional feature of the invention, to produce a defined transition resistance, the defined contact pressure is, advantageously, realized by a fastening screw. The fastening screw holds the electric motor, for example, on a one-arm bearing cross or directly on a housing of the household appliance, for example, the rear side of the laundry tub in the case of a washing machine. If the fastening screw is tightened with a defined torque, this results in a defined contact pressure, which, in turn, fixes the transition resistance.

In accordance with yet another feature of the invention, the fastening device has a first clearance for receiving a screw shank of a screw having a screw head with a seating surface and an insulating layer is disposed under the seating surface of the screw head.

In accordance with yet a further feature of the invention, the screw has a screw shank and a screw head with a seating surface, the fastening device has a first clearance for receiving the screw shank, and an insulating layer is disposed under the seating surface of the screw head.

The invention also allows the fastening of the electric motor to be performed by only one fastening screw, it being possible, for example, for arresting pins to be provided for the additional rotational fixing of the electric motor. The arresting pins are, advantageously, formed from nonconductive material, that is, from material without residual conductivity, or are coated with a nonconductive material.

This ensures that the defined resistance between the electric motor and the fastening for discharging the electrostatic charge is determined alone by the insulating material with a defined residual conductance that is used in the region of the fastening screw together with the defined contact pressure.

The invention is also advantageous because it allows the electric motor to be mounted with only one fastening screw, which is tightened with a defined torque. This has considerable associated cost advantages, in particular, for mass production. Furthermore, this also has advantages for quality assurance.

In accordance with yet an added feature of the invention, the fastening device has at least a second clearance for receiving the arresting pin.

In accordance with yet an additional feature of the invention, the fastening device has at least one projection for being received in a corresponding clearance and an insulating layer of an electrically nonconductive material is disposed between the at least one projection and the corresponding clearance.

The invention is suitable both for a direct drive—for example, an electric motor directly driving the laundry drum—and for an indirect drive—for example, an electric motor which drives the shaft of a laundry drum or a gear mechanism or a V-belt, as disclosed for example by German Published, Non-Prosecuted Patent Application DE 199 11 139 A1, corresponding to U.S. Pat. No. 6,499,323 to Skrippek et al.

In accordance with again another feature of the invention, the fastening device has a one-arm fastening for the electric motor.

With the objects of the invention in view, there is also provided a drive device for a household appliance having an electric motor, the drive device including a means for fastening the electric motor to the appliance, and a means for electrically insulating the electric motor from the fastening means disposed between the fastening means and the electric motor, the insulating means having a defined resistance for discharging electrostatic charges from the electric motor.

With the objects of the invention in view, in a household appliance having an electric motor, there is also provided a drive device including a motor fastening device for fastening the electric motor to the appliance, and an insulator disposed between the fastening device and the electric motor for electrically insulating the electric motor from the fastening device, the insulator having a defined resistance for discharging electrostatic charges from the electric motor.

In accordance with again an added feature of the invention, the appliance is a washing machine, a laundry dryer, or a food processor.

With the objects of the invention in view, there is also provided a method for mounting an electric motor at a household appliance with a fastening screw, including the steps of disposing an insulator of a defined residual conductivity between the electric motor and the household appliance, and tightening a fastening screw with a defined torque to press the insulator between the electric motor and the household appliance with a defined contact pressure and to produce a defined transition resistance.

With the objects of the invention in view, there is also provided a method for mounting an electric motor at a household appliance, including the steps of disposing an insulator of a defined residual conductivity between the electric motor and the household appliance, mounting the electric motor at the household appliance with a fastening screw, and tightening a fastening screw with a defined torque to press the insulator between the electric motor and the household appliance with a defined contact pressure and to produce a defined transition resistance.

Other features that are considered as characteristic for the invention are set forth in the appended claims.

Although the invention is illustrated and described herein as embodied in a drive device for a household appliance and method for mounting an electric motor, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
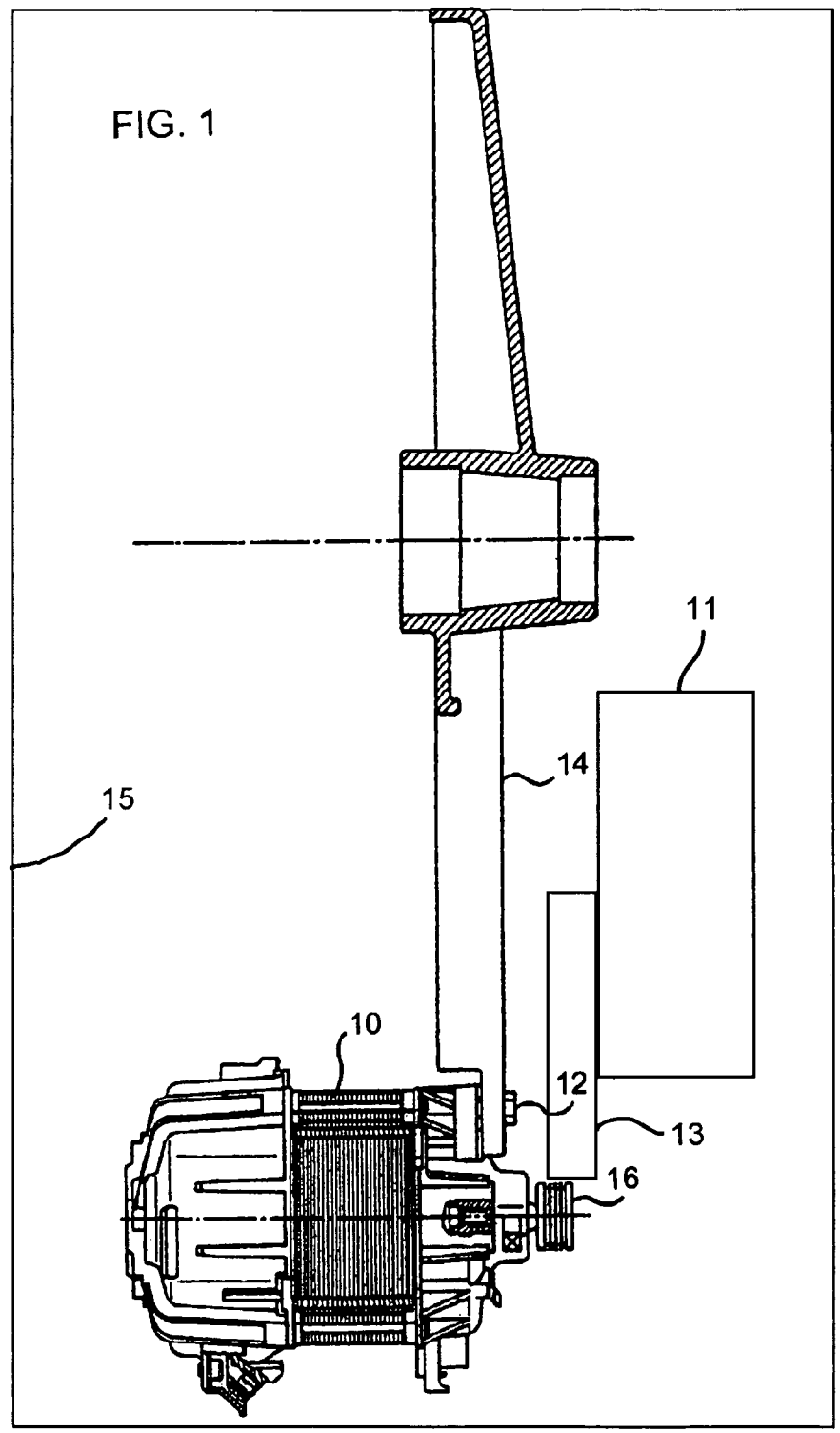
FIG. 1 is a lateral cross-sectional view of a drive device according to the invention.

Referring now to the figures of the drawings in detail and first, particularly to FIG. 1 thereof, there is shown an electric motor 10, which is connected by a fastening screw 12 to a one-arm bearing cross 14. The electric motor 10 has a V-belt pulley 16 for receiving a V-belt, for instance, for driving the laundry drum 11 of a washing machine, of a laundry dryer, or of a food processor. The drive device shown in FIG. 1 is a so-called indirect drive because between the electric motor 10 and the element to be driven there is a gear mechanism 13—in the example shown, a V-belt gear mechanism. However, the invention is not restricted to such a configuration; it can also be realized in the case of other drive configurations, in particular in the case of direct drives without a gear mechanism interposed. In the case of a direct drive, for instance, the fastening screw 12 of the electric motor 10 would be fixed directly to a housing 15 of the household appliance, or, for example, to the laundry tub.

Figure 2:
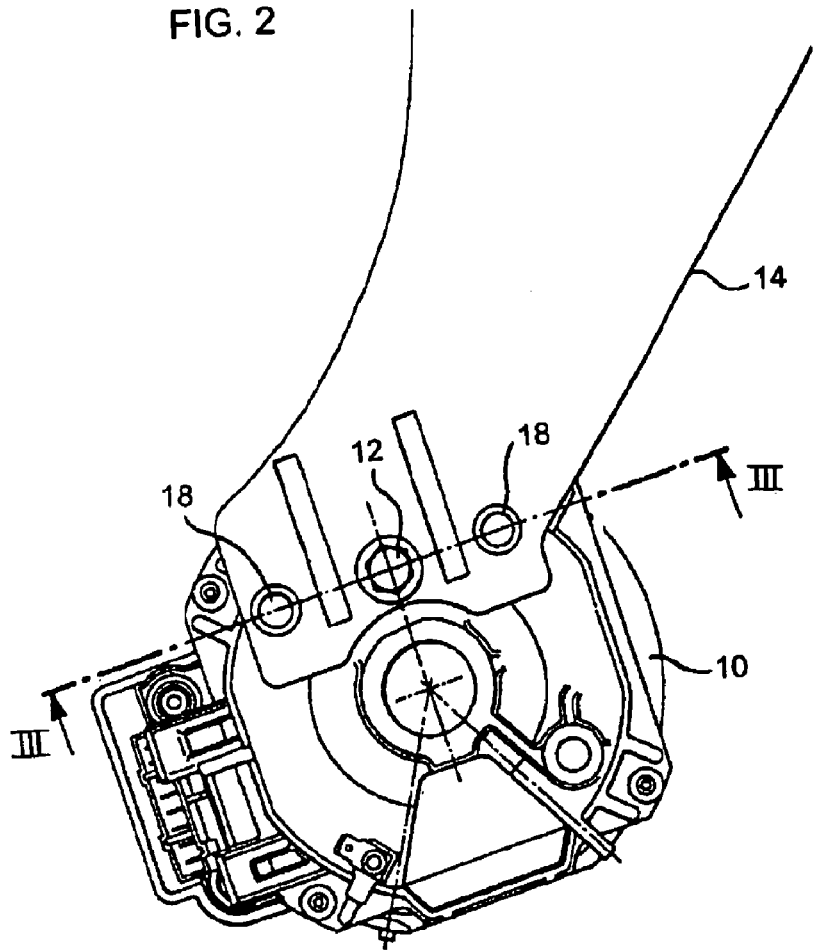
FIG. 2 is an enlarged, fragmentary, plan view of the drive device of FIG. 1.
Figure 3:
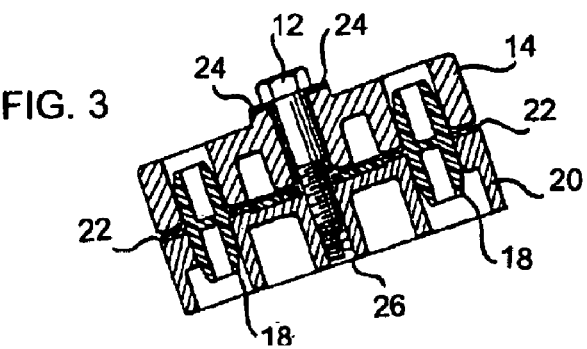
FIG. 3 is a cross-sectional view of the drive device of FIG. 2 along section line III-III.

Hereafter, elements of the figures that are the same or correspond to one another are designated by the same reference numerals. FIG. 2 shows a view of a detail of the drive device of FIG. 1. Along the sectional line A-A of FIG. 2 there are arresting pins 18 along with the fastening screw 12, which engage in corresponding clearances both of the one-arm bearing cross 14 and in the bearing plate 20 of the electric motor 10. The arresting pins 18 are of an electrically nonconductive plastic.

In a region between the one-arm bearing cross 14 and the bearing plate 20, there are insulating layers 22, which are, likewise, of an electrically nonconductive plastic. The insulating layers 22 may be formed as a structural unit with the arresting pin or pins 18, which is advantageous when mounting the electric motor 10.

The one-arm bearing cross 14 has a bore for receiving the shank of the fastening screw 12. The inner side of the bore is coated with an insulating layer 24, which is of a material with a defined conductivity. The insulating layer 24 extends outside the bore in the one-arm bearing cross 14 to under the seating surface of the screw head of the fastening screw 12 so that the tightened fastening screw 12 is insulated from the one-arm bearing cross 14 by the insulating layer 24. On the other hand, the fastening screw 12 engages in an internal thread 26 in the bearing plate 20 of the electric motor 10 so that a connection with good electrical conduction is established between the fastening screw 12 and the electric motor 10.

The fastening screw 12 is tightened with a defined torque so that a defined contact pressure is obtained in the region of the seating of the screw head of the fastening screw 12 on the insulating layer 24. The defined contact pressure produces a defined transition resistance for the transitions between the one-arm bearing cross 14 and the insulating layer 24, on one hand, and the insulating layer 24 and the fastening screw 12, on the other hand. The transition resistances defined in this way, together with the defined conductance of the material of the insulating layer 24, produce a defined resultant resistance for the electrical connection between the bearing plate 20 of the electric motor 10 and the one-arm bearing cross 14.

The defined resistance is, advantageously, chosen in the range between 0.5 and 2 megaohms, preferably, 1 megaohm. Such a range ensures, on one hand, effective suppression of the undesired high-frequency discharge currents and, on the other hand, permits the desired discharging of electrostatic charge from the electric motor 10 through the one-arm bearing cross 14.

The fastening of the electric motor 10 by the one fastening screw 12 also has the advantage that, when the electric motor 10 is being mounted, only this one screw 12 has to be tightened with a defined torque to realize both the mechanical fixing of the electric motor 10 and the establishment of a defined resistance for discharging electrostatic charges from the electric motor. Because the tightening of the fastening screw 12 constitutes only one working step, this has advantages both with regard to production costs and also with regard to quality control.

Figure 4:
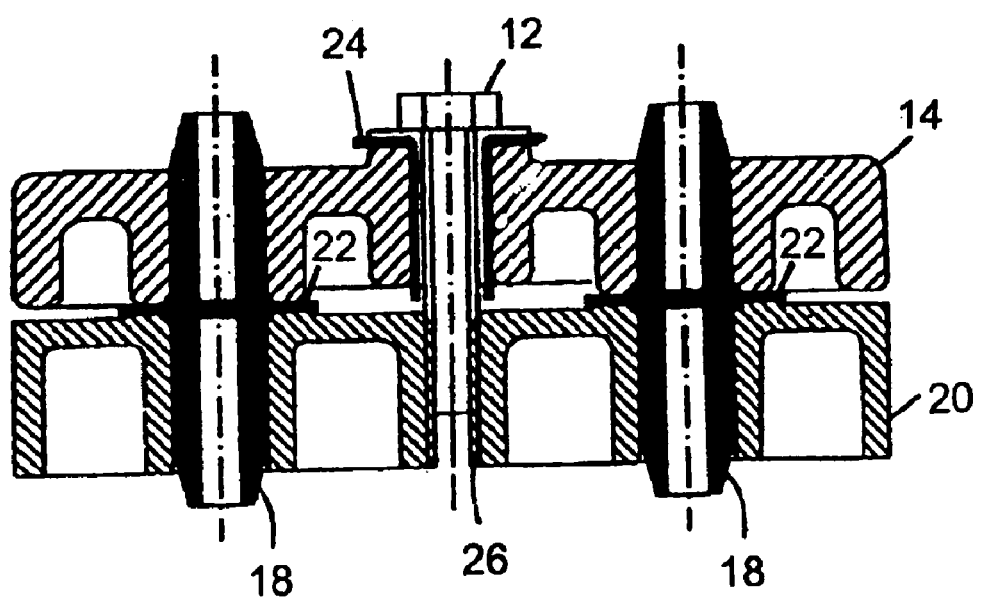
FIG. 4 is a cross-sectional view of an alternative embodiment of the drive device of FIGS. 2 and 3.

FIG. 4 shows an alternative embodiment of the invention, in which, in comparison with the embodiment of FIG. 2, the arresting pins 18 respectively have projections for realizing the insulating layer 22. The projections also serve as a mounting aid because they fix the depth of insertion of the arresting pins 18 into the corresponding bores in the bearing plate 20. The material of the arresting pins 18 and of the insulating layer 22 is, in turn, electrically nonconductive so that the defined overall resistance—as in the case of the exemplary embodiment of FIG. 2—is determined by the insulating layer 24 together with the defined contact pressure of the fastening screw 12.

Figure 5:
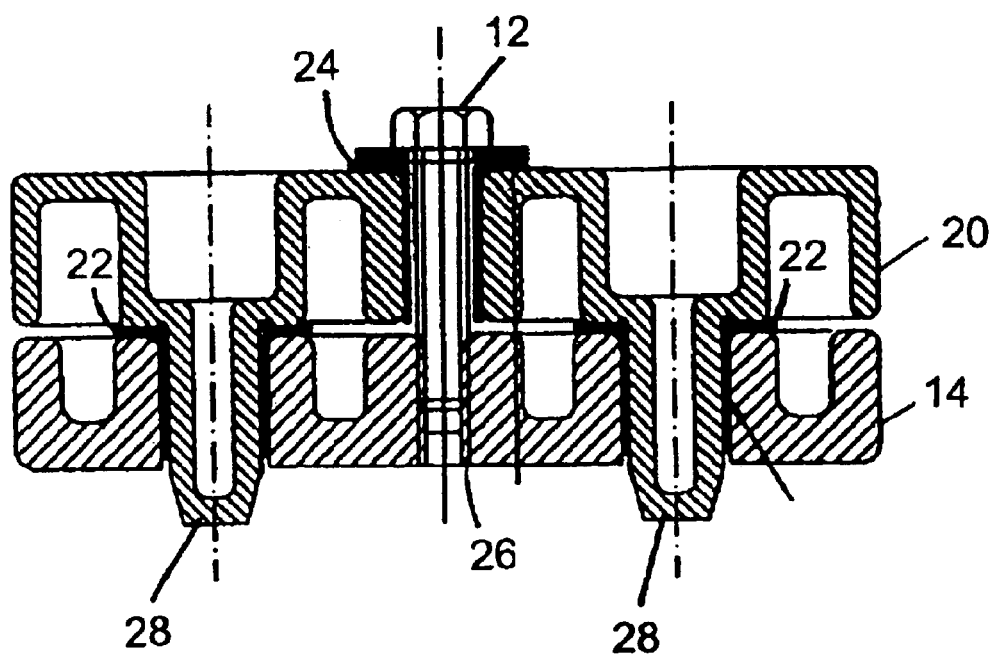
FIG. 5 is a cross-sectional view of another embodiment of the drive device of FIGS. 2 and 3.

FIG. 5 shows a further alternative exemplary embodiment, in which the insulating layer 24 is realized in the bearing plate 20 of the electric motor 10 and the thread 26 is realized in the one-arm bearing cross 14. The bearing plate 20 has projections 28, which engage in corresponding clearances in the one-arm bearing cross 14. Between the projections 28 and their bearing surface with the corresponding clearances is the insulating layer 22 of electrically nonconductive material so that the defined overall resistance is, in turn, fixed by the insulating layer 24 together with the defined contact pressure by the fastening screw 12.

Figure 6:
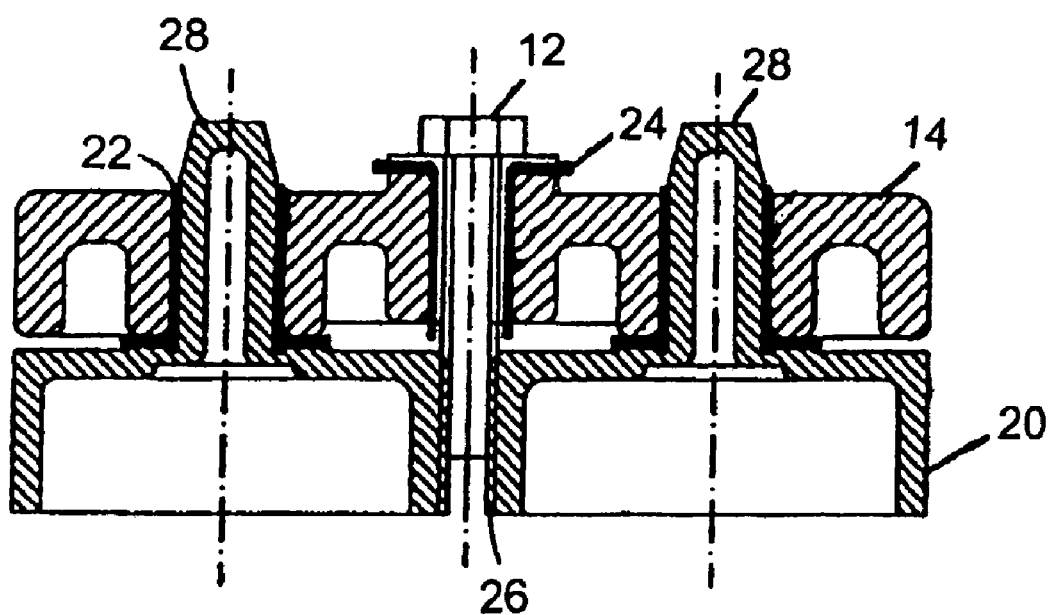
FIG. 6 is a cross-sectional view of a further alternative embodiment of the drive device of FIGS. 2 and 3.

FIG. 6 shows a further preferred exemplary embodiment of the invention, in which, in comparison with the exemplary embodiment of FIG. 5, the insulating layer 24 is, in turn, formed in the one-arm bearing cross 14 and the thread 26 is formed into the bearing plate 20 of the electric motor 10. The projections 28 are located on the bearing plate 20 of the electric motor 10 and engage in corresponding clearances in the one-arm bearing cross 14, from which they are insulated by an insulating layer 22 of nonconductive material.

We claim:

1. A household appliance comprising:
    a housing;
    a drum disposed within the housing;
    an electric motor having a bearing plate and driving the drum;
    an arm supported by the housing of the household appliance and being coupled to the bearing plate;
    a threaded fastener coupling the motor to the arm;
    a first insulator being disposed between the bearing plate and the arm and suppressing discharge currents between the electric motor and the arm;
    a second insulator disposed between the threaded fastener and the arm and permitting the discharge of electrostatic charges from the electric motor to the arm; and
    wherein the first and second insulators are made from different materials having different electrical properties from one another.

2. The household appliance according to claim 1, wherein the electric motor directly drives the drum.

3. The household appliance according to claim 1, further comprising a gear mechanism coupling the electric motor and the drum to transfer rotation from the electric motor to the drum and the electric motor indirectly driving the drum.

4. The household appliance according to claim 3, wherein the gear mechanism includes a belt and pulley arrangement.

5. The household appliance according to claim 1, wherein the second insulator comprises an electrically conductive plastic material.

6. The household appliance according to claim 1, wherein the second insulator comprises a plastic with an admixture of an electrically conductive material including at least one of carbon and metal powder.

7. The household appliance according to claim 1, wherein the resistance of the second insulator between the electric motor and the fastening device is between approximately 0.5 megaohm and approximately 2 megaohms.

8. The household appliance according to claim 1, wherein the resistance of the second insulator between the electric motor and the fastening device is approximately 1 megaohm.

9. The household appliance according to claim 1, wherein the threaded fastener provides a contact pressure in response to a defined torque, the defined resistance of the second insulator being determined in response to the contact pressure of the threaded fastener.

10. The household appliance according to claim 1, wherein the first insulator is formed from an electrically nonconductive plastic material and the second insulator comprises an electrically conductive plastic material.

11. The household appliance according to claim 1, wherein the at least one of the arm and the bearing plate defines a recess and the other of the arm and the bearing plate includes a projection, the projection extending into the recess to at least partially couple the arm to the bearing plate, the first insulator being at least partially disposed between the projection and the recess.

12. The household appliance according to claim 11, wherein the projection is integrally formed with the at least one of the arm and the bearing plate.

13. The household appliance according to claim 1, wherein the bearing plate defines a threaded bore, the threaded fastener directly engaging the threaded bore in an electrically conductive connection.

14. A household appliance comprising:
a housing;
a drum disposed within the housing;
an electric motor having a bearinp plate and driving the drum;
an arm supported by the housing of the household appliance and being coupled to the bearing plate;
a threaded fastener coupling the motor to the arm;
a first insulator being disposed between the bearing plate and the arm and suppressing discharge currents between the electric motor and the arm;
a second insulator disposed between the threaded fastener and the arm and permitting the discharge of electrostatic charges from the electric motor to the arm; and
wherein the first and second insulators do not contact one another.

15. A household appliance comprising:
a housing;
a drum disposed within the housing;
an electric motor having a bearing plate and driving the drum;
an arm supported by the housing of the household appliance and being coupled to the bearing plate;
a threaded fastener coupling the motor to the arm;
a first insulator being disposed between the bearing plate and the arm and suppressing discharge currents between the electric motor and the arm;
a second insulator disposed between the threaded fastener and the arm and permitting the discharge of electrostatic charges from the electric motor to the arm; and
wherein the arm defines an arm recess and the bearing plate defines a plate recess, an arresting pin extending into the arm and plate recesses to at least partially couple the arm to the bearing plate, the arresting pin at least partially forming the first insulator.

16. The household appliance according to claim 15, wherein the arm defines a second arm recess and the bearing plate defines a second plate recess, a second arresting pin extending into the second arm recess and second plate recess to at least partially couple the arm to the bearing plate, the second arresting pin at least partially forming the first insulator.

17. A household appliance comprising:
a housing;
a drum disposed within the housing;
an electric motor having a bearing plate and driving the drum;
an arm supported by the housing of the household appliance and being coupled to the bearing plate;
a threaded fastener coupling the motor to the arm;
a first insulator being disposed between the bearing plate and the arm and suppressing discharge currents between the electric motor and the arm;
a second insulator disposed between the threaded fastener and the arm and permitting the discharge of electrostatic charges from the electric motor to the arm; and
wherein the at least one of the arm and the bearing plate defines two recesses and the other of the arm and the bearing plate includes two projections, the projections extending into the corresponding recesses to at least partially couple the arm to the bearing plate, the first insulator being at least partially disposed between each projection and the corresponding recess.

18. The household appliance according to claim 17, wherein the projections are integrally formed with the at least one of the arm and the bearing plate.

* * * * *

UNITED STATES PATENT AND TRADEMARK OFFICE
CERTIFICATE OF CORRECTION

PATENT NO. : 7,320,185 B2  Page 1 of 1
APPLICATION NO. : 10/462421
DATED : January 22, 2008
INVENTOR(S) : Heyder et al.

It is certified that error appears in the above-identified patent and that said Letters Patent is hereby corrected as shown below:

On the title page item (73), should read: BSH Bosch und Siemens Hausgeraete GmbH, Munich (DE)

Signed and Sealed this

Eleventh Day of March, 2008

JON W. DUDAS
*Director of the United States Patent and Trademark Office*